(12) United States Patent
LaTendresse et al.

(10) Patent No.: US 10,159,201 B2
(45) Date of Patent: Dec. 25, 2018

(54) APPARATUS AND METHODS FOR CUTTING AN OBJECT

(71) Applicant: BARKO HYDRAULICS, LLC, Superior, WI (US)

(72) Inventors: Philip E. LaTendresse, Chassell, MI (US); Jeffrey S. Volden, Acworth, GA (US)

(73) Assignee: BARKO HYDRAULICS, LLC, Superior, WI (US)

( * ) Notice: Subject to any disclaimer, the term of this patent is extended or adjusted under 35 U.S.C. 154(b) by 60 days.

(21) Appl. No.: 14/696,923

(22) Filed: Apr. 27, 2015

(65) Prior Publication Data
US 2015/0313097 A1 Nov. 5, 2015

Related U.S. Application Data

(60) Provisional application No. 61/986,481, filed on Apr. 30, 2014.

(51) Int. Cl.
*B26D 1/157* (2006.01)
*A01G 23/091* (2006.01)
*B26D 7/02* (2006.01)
*B23D 45/00* (2006.01)

(52) U.S. Cl.
CPC .......... *A01G 23/091* (2013.01); *B23D 45/006* (2013.01); *B26D 1/157* (2013.01); *B26D 7/02* (2013.01); *Y10T 83/04* (2015.04); *Y10T 83/667* (2015.04)

(58) Field of Classification Search
CPC ...... A01G 23/091; B23D 45/006; B26D 7/02; B26D 1/157; Y10T 83/04; Y10T 83/667
See application file for complete search history.

(56) References Cited

U.S. PATENT DOCUMENTS

| | | | | |
|---|---|---|---|---|
| 4,020,726 A | * | 5/1977 | Coats | B26D 1/08 83/397 |
| 4,090,540 A | | 5/1978 | Smith et al. | |
| 4,269,241 A | * | 5/1981 | Hickman | A01G 3/08 144/24.13 |
| 4,434,827 A | * | 3/1984 | Franklin | A01G 23/091 144/336 |
| 4,437,500 A | * | 3/1984 | Larose | A01G 23/091 144/335 |
| 4,467,849 A | | 8/1984 | Denis | |
| 4,625,464 A | * | 12/1986 | Kubo | B23D 45/006 30/92 |

(Continued)

OTHER PUBLICATIONS

International Search Report and Written Opinion for PCT/US2015/027736 dated Jul. 2, 2015, 10 pgs.

*Primary Examiner* — Stephen Choi
*Assistant Examiner* — Liang Dong
(74) *Attorney, Agent, or Firm* — Brinks Gilson & Lione

(57) ABSTRACT

The present embodiments are directed to apparatus and methods for cutting an object. In one embodiment, the apparatus comprises a cutting device and an actuation device operatively coupled to the cutting device. A guide structure may be coupled at least partially between the cutting device and the actuation device. A supporting framework may provide a guiding path for linear advancement or retraction of the guide structure, and in turn linear advancement or retraction the cutting device, upon actuation of the actuation device.

20 Claims, 6 Drawing Sheets

(56) References Cited

U.S. PATENT DOCUMENTS

| | | | |
|---|---|---|---|
| 4,625,781 A | | 12/1986 | Miller et al. |
| 4,653,555 A | | 3/1987 | Mellgren |
| 4,738,291 A | | 4/1988 | Isley |
| 4,800,936 A | | 1/1989 | Pomies et al. |
| 4,850,409 A | * | 7/1989 | Roberson ............ A01G 23/091 144/336 |
| 4,987,935 A | * | 1/1991 | Corcoran ............ A01G 23/091 144/241 |
| 4,998,573 A | | 3/1991 | York |
| 5,101,872 A | | 4/1992 | Scheuren |
| 5,113,919 A | | 5/1992 | MacLennan |
| 5,337,847 A | | 8/1994 | Woods et al. |
| 5,709,254 A | | 1/1998 | Argue |
| 5,727,610 A | | 3/1998 | Isley |
| 5,785,101 A | | 7/1998 | Wildey |
| 6,062,793 A | | 5/2000 | Isley |
| 6,123,124 A | | 9/2000 | Naud |
| 6,267,163 B1 | | 7/2001 | Holmes |
| 6,435,235 B1 | | 8/2002 | Hicks |
| 6,516,841 B1 | | 2/2003 | Oilund |
| 6,684,923 B1 | | 2/2004 | Isley |
| 6,986,368 B2 | | 1/2006 | Brown |
| 7,225,842 B2 | | 6/2007 | Isley |
| 7,874,327 B2 | | 1/2011 | Barlow et al. |
| 7,997,309 B2 | | 8/2011 | Isley et al. |
| 8,002,004 B2 | | 8/2011 | Smythe |
| 8,141,602 B2 | | 3/2012 | Roy |
| 8,276,577 B2 | | 10/2012 | Wills, II |
| 2009/0026296 A1 | | 1/2009 | Isley et al. |

\* cited by examiner

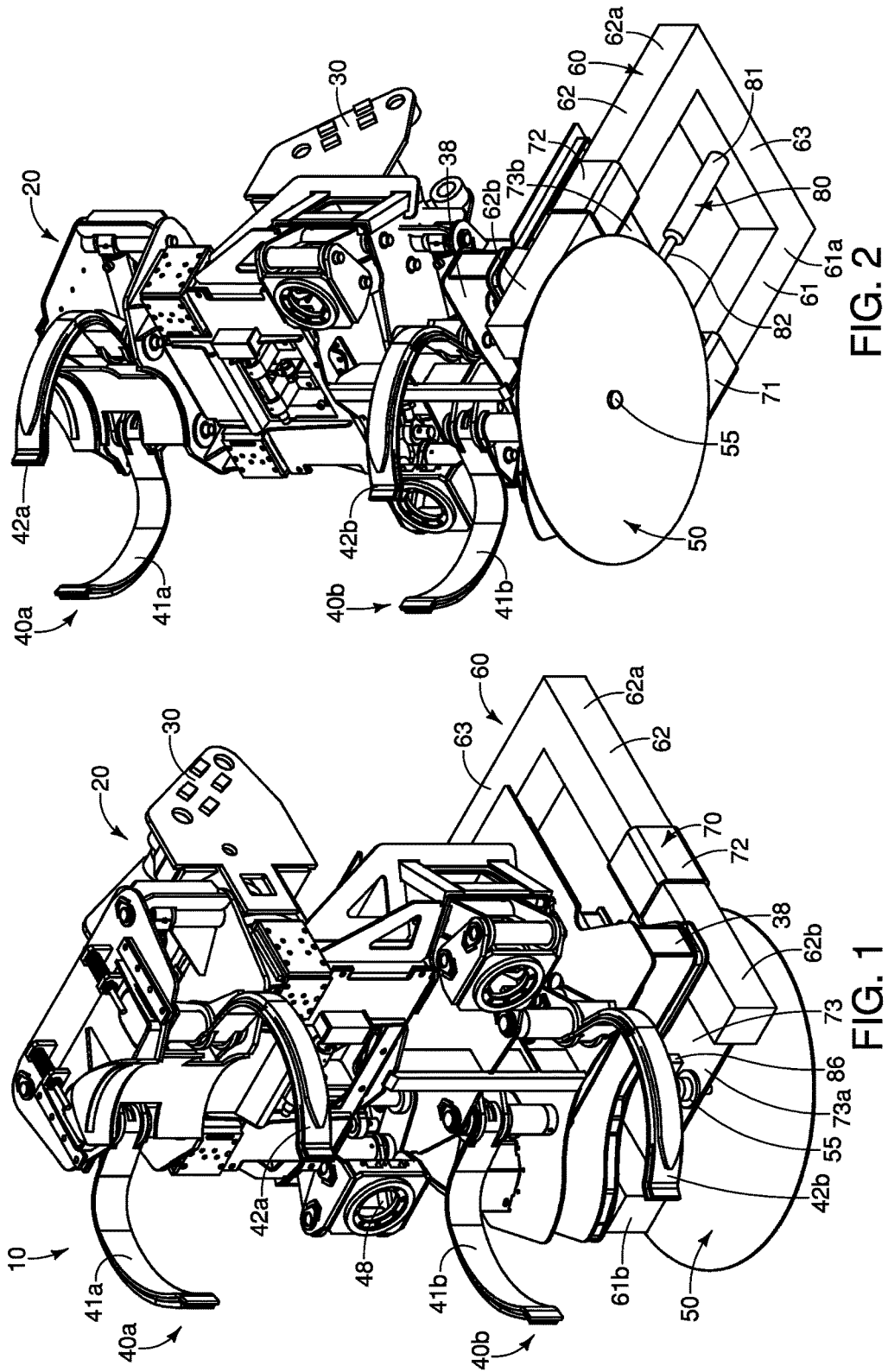

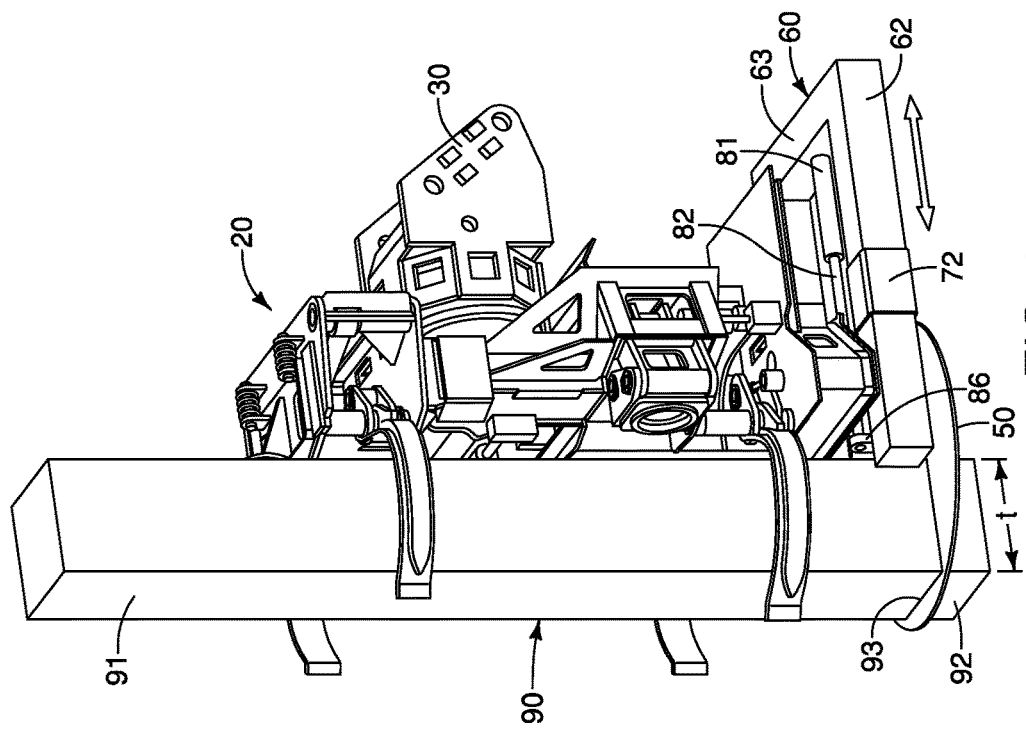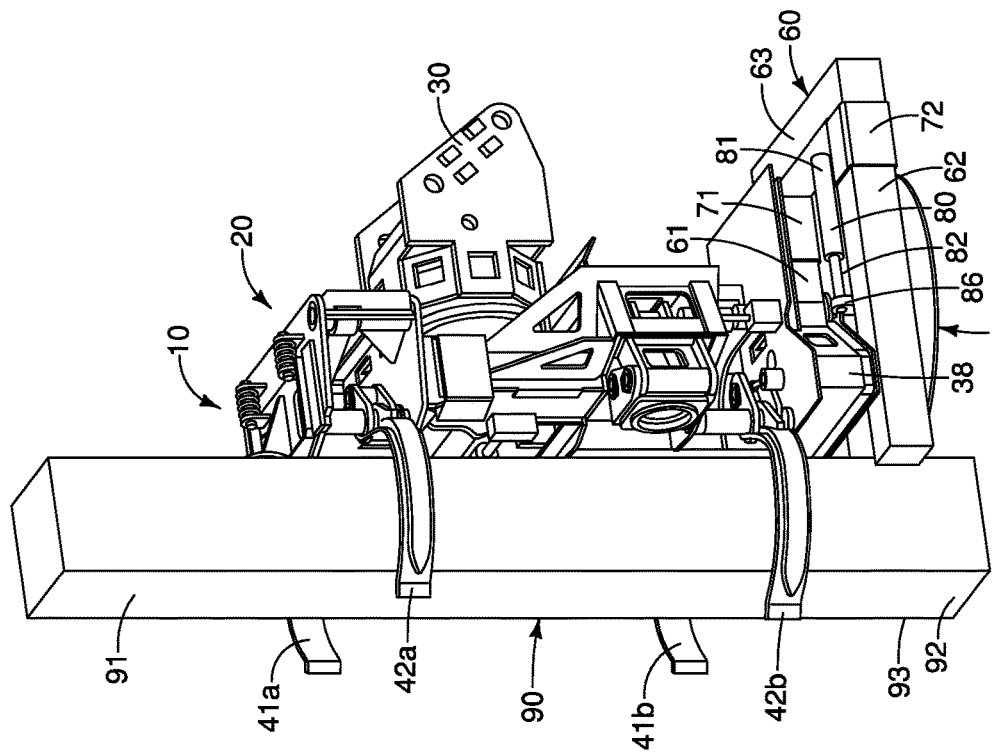

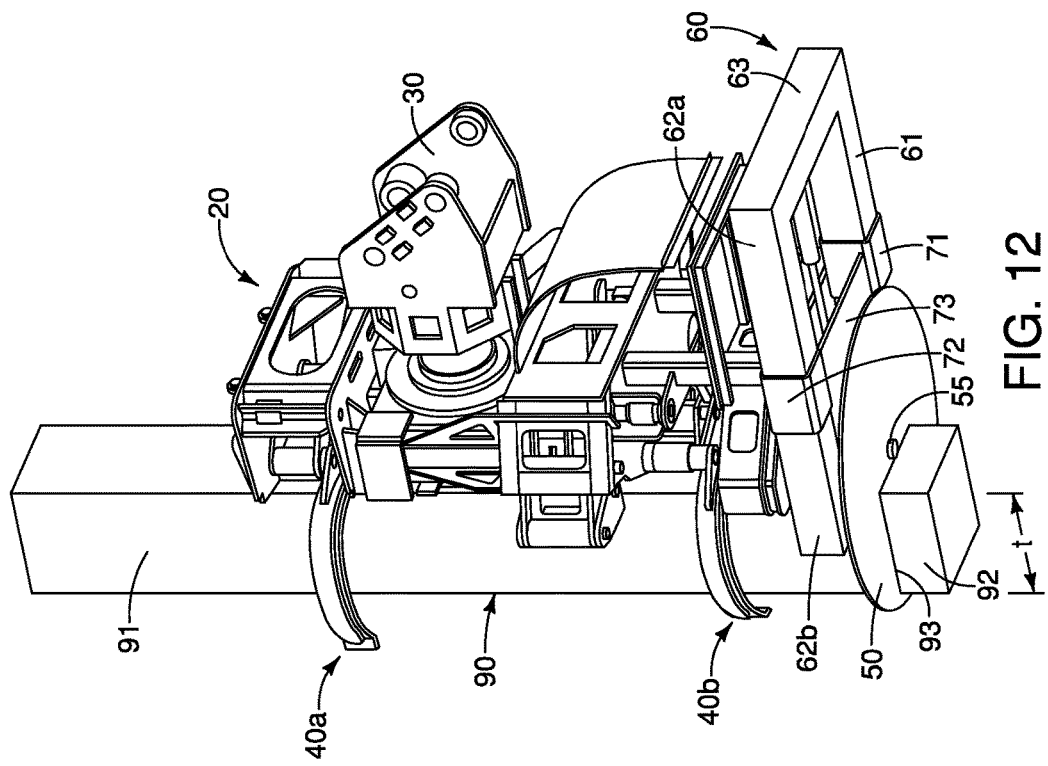
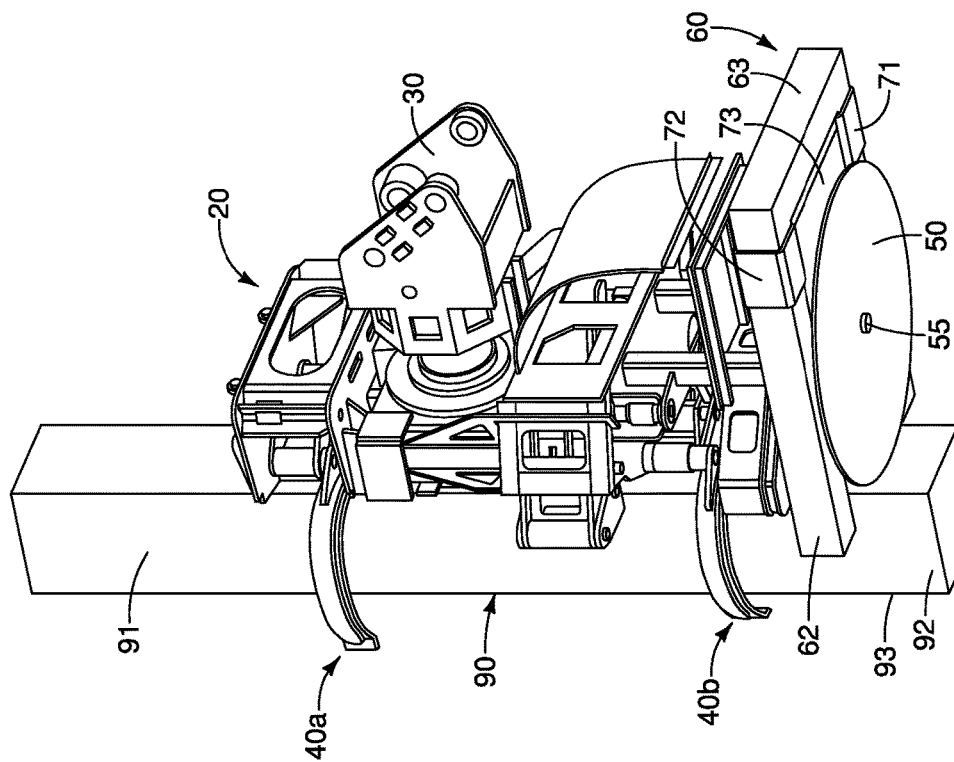

APPARATUS AND METHODS FOR CUTTING AN OBJECT

PRIORITY CLAIM

This invention claims the benefit of priority of U.S. Provisional Application Ser. No. 61/986,481, entitled "Apparatus and Methods for Cutting an Object," filed Apr. 30, 2014, the disclosure of which is hereby incorporated by reference in its entirety.

BACKGROUND

The present embodiments generally relate to apparatus and methods for cutting an object, and more specifically, to apparatus and methods for cutting an object in a time efficient and user-friendly manner Various devices are known for cutting forestry-related objects into smaller pieces, as well as devices for cutting reinforced concrete, columns, piling, beams and the like. There are often instances in which cutting such objects may be difficult or time consuming, particularly if the objects require a relatively strong cutting device.

Prior techniques for cutting such difficult objects have required multiple operators to position or advance a cutting device relative to the object, or require manual positioning of a cutting device in close proximity to an object, which yields safety hazards. Other techniques have required formation of tracks secured to the object and advancement of a cutting device along the tracks, which necessitate increased time and less efficiency.

Still further prior techniques for cutting difficult objects have relied upon methods that cut into a first side of the object, then withdraw and reposition the cutting device at a second side of the object, such that multiple different cuts meet up with one another within the object to complete one cut through. Such techniques may be time consuming due to the multiple cuts and repositioning required to perform the cut through, and may yield inaccurate results if the various cuts at different locations do not meet up with one another within the object.

It would be beneficial to provide apparatus and methods for cutting an object in a safe, efficient, and relatively fast manner.

SUMMARY

The present embodiments are directed to apparatus and methods for cutting an object. In one embodiment, the apparatus comprises a cutting device and an actuation device operatively coupled to the cutting device. A guide structure may be coupled at least partially between the cutting device and the actuation device. A supporting framework may provide a guiding path for linear advancement or retraction of the guide structure, and in turn linear advancement or retraction the cutting device, upon actuation of the actuation device.

In one embodiment, the supporting framework comprises first and second guide rails that are parallel and laterally spaced apart relative to one another. The first and second guide rails may be separated by a lateral segment, such that at least a portion of the supporting framework forms a generally U-shape. A fixed end of the actuation device may be secured to the lateral segment of the supporting framework.

The guide structure may comprise first and second arms and a guide plate extending laterally therebetween, wherein the first and second guide arms are disposed for axial movement along the first and second guide rails, respectively. A first region of the guide plate may be coupled to the cutting member, and a second region of the guide plate may be secured to the actuation device.

An extendable portion of the actuation device may be coupled directly to the guide structure, and a fixed portion of the actuation device may be secured directly to the supporting framework. In one embodiment, the actuation device may comprise a linear actuator. A portion of the actuation device may be coupled to an upper surface of the guide structure, and the cutting device may be coupled to a lower surface of the guide structure.

In one embodiment, the guide structure comprises a forward end that terminates substantially immediately after a location in which guide structure is coupled to the cutting device. The cutting device may comprise a circular shape, and the cutting device may be dimensioned such that less than half of the radius of the cutting device cuts through a thickness of the object in a single cut.

The cutting device may be operatively coupled to a main frame, and the apparatus may further comprise at least one gripping device coupled to the main frame and configured to grip an object to be cut.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view, angled from above towards below, of a first embodiment of an apparatus for cutting an object.

FIG. 2 is a perspective view, angled from below towards above, of the apparatus for cutting an object of FIG. 1.

FIGS. 7-8 are, respectively, perspective views of the apparatus of FIG. 1 before and after cutting an object.

FIGS. 11-12 are, respectively, further alternative perspective views of the apparatus of FIG. 1 before and after cutting an object.

DETAILED DESCRIPTION OF THE PREFERRED EMBODIMENTS

Figure 4:
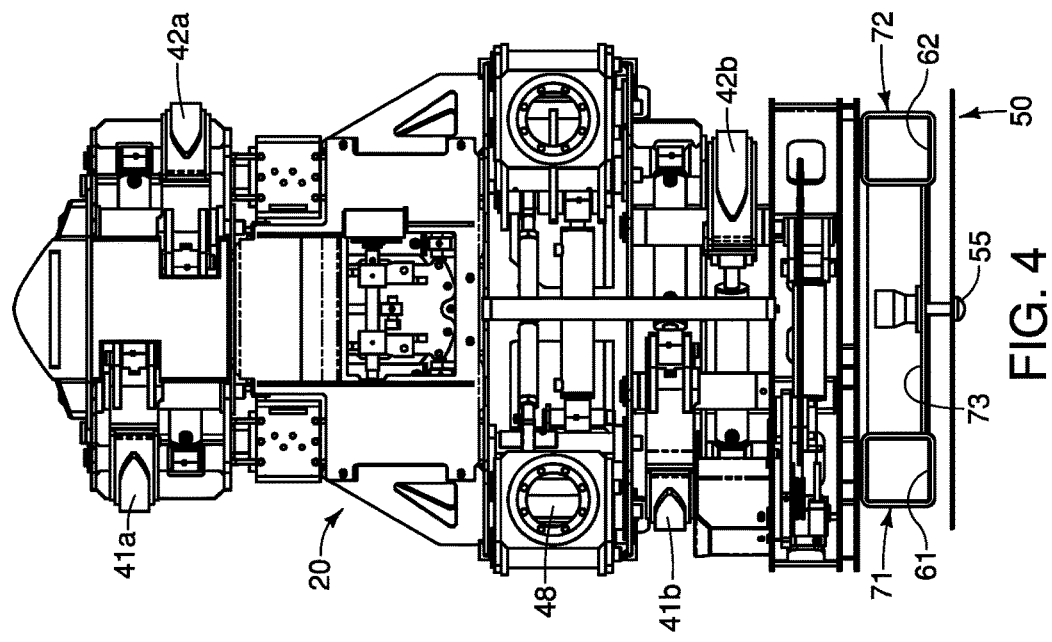
FIG. 4 is a front view of the apparatus for cutting an object of FIG. 1.
Figure 3:
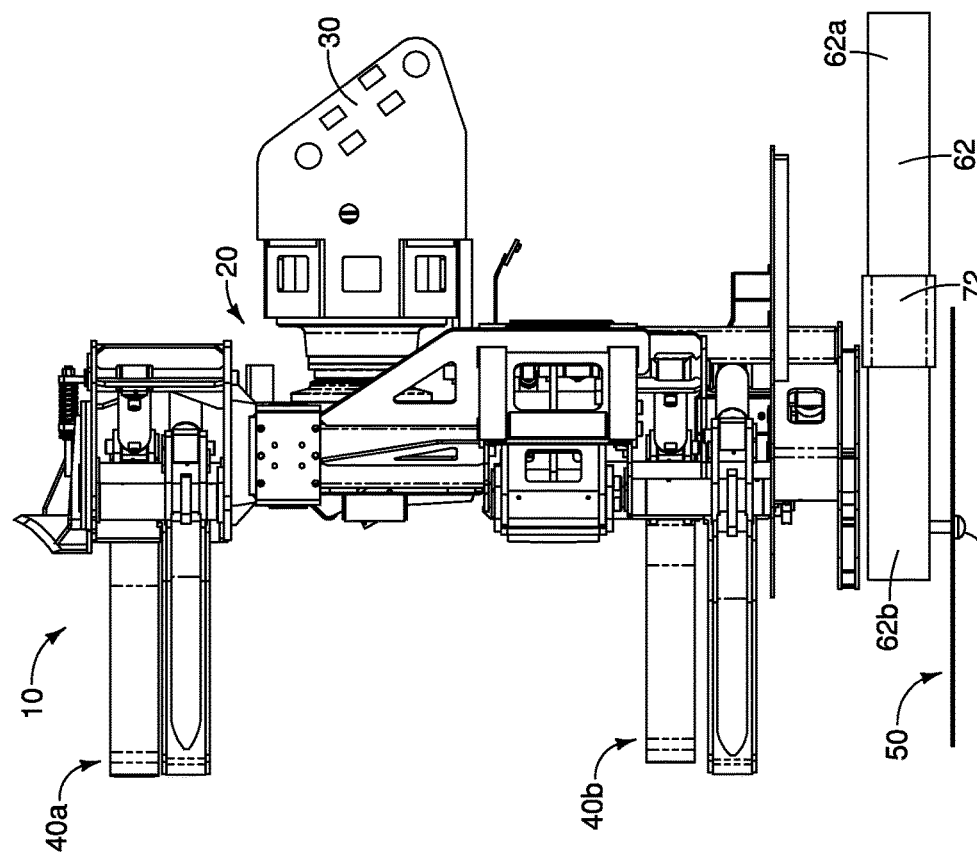
FIG. 3 is a side view of the apparatus for cutting an object of FIG. 1.
Figure 6:
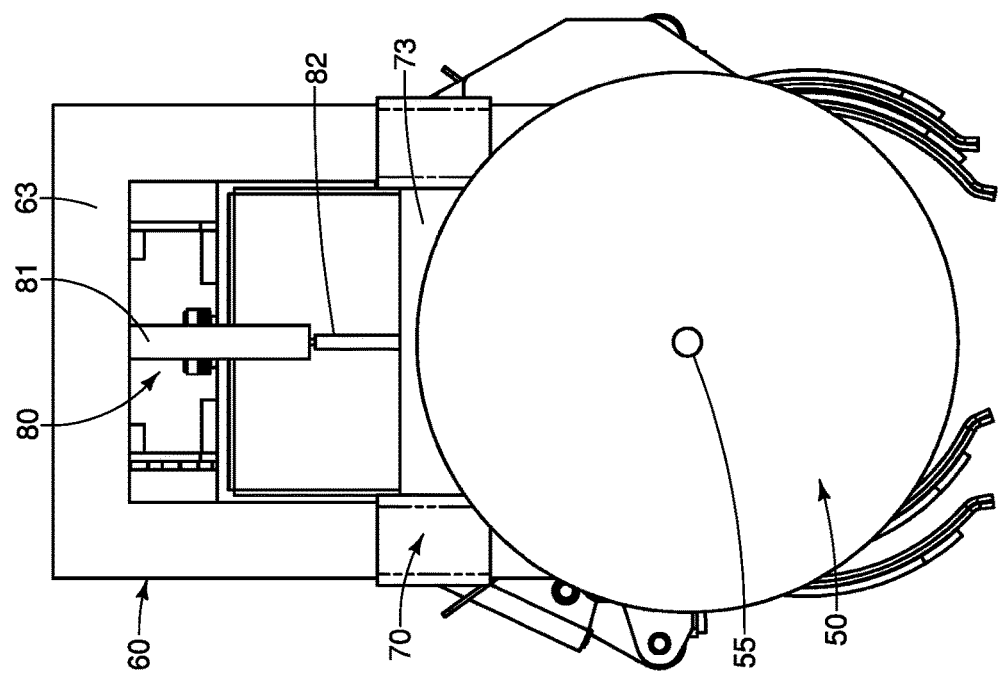
FIG. 6 is a bottom view of the apparatus for cutting an object of FIG. 1.
Figure 5:
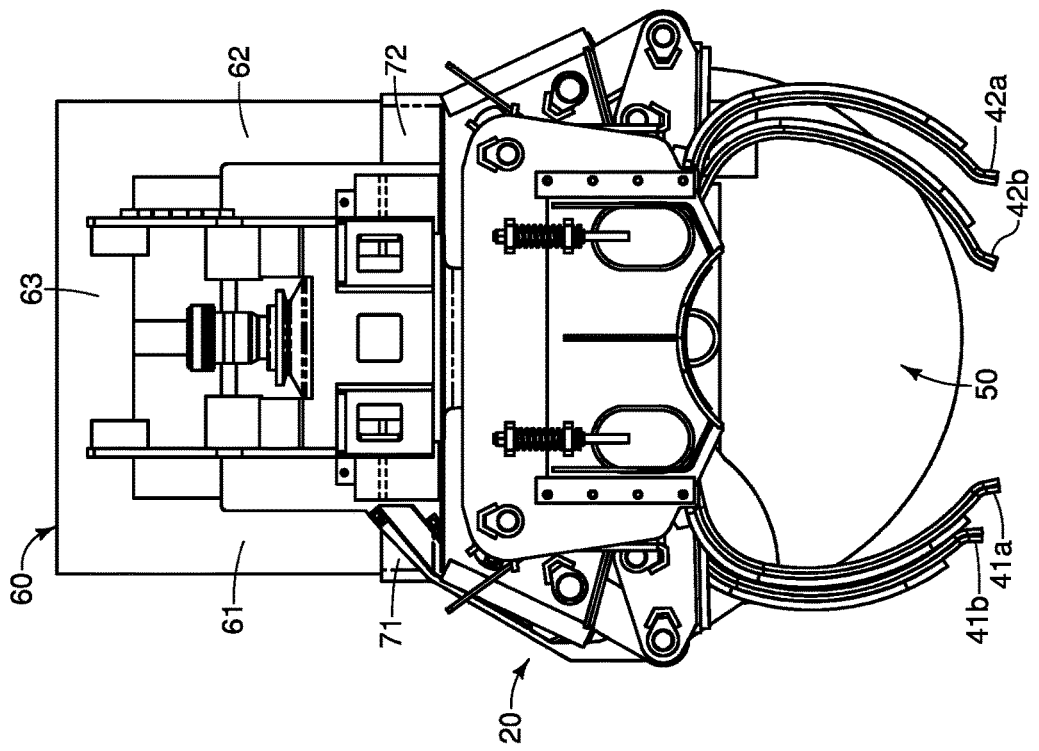
FIG. 5 is a top view of the apparatus for cutting an object of FIG. 1.

Referring now to FIGS. 1-6, a first embodiment of a system 10 for cutting an object is shown and described. The system 10 comprises a main frame 20, which generally comprises one or more solid sections that are coupled to or facilitate movement of various parts of the system 10. The main frame 20 may comprise, or be coupled to, an adapter 30. The adapter 30 may be coupled to any suitable machine, by way of example and without limitation, such as a mobile machine along the lines of a truck, tractor, forklift, automobile and the like. The adapter 30 may be removably coupled to any such machine using removable attachment linkages or coupling mechanisms that are generally known.

In one embodiment, one or more gripping devices may be coupled to the main frame 20. In the non-limiting example of FIGS. 1-6, a plurality of gripping devices 40a and 40b are provided and generally spaced apart in a vertical direction, although it is possible that a plurality of gripping devices may be provided at non-vertical orientations relative to each other, so long as the object to be cut can be gripped appropriately.

The gripping device 40a may comprise first and second arms 41a and 42a, while the gripping device 40b may comprise first and second arms 41b and 42b, as shown in FIGS. 1-6. Alternatively, each gripping device may comprise one arm, e.g., having a curvature of about 180 to about 270 degrees, or may comprise three or more arms that work together, so long as the object to be cut can be gripped appropriately.

In still further embodiments, the one or more gripping devices 40a and 40b may be omitted altogether, and a cutting device 50 may make an appropriate cut into an object without stabilization assistance from any such gripping devices. In certain embodiments, one or more gripping devices may be removably coupled to the main frame 20, and optionally used depending on whether the gripping devices may be helpful in desired applications.

The system 10 further comprises a cutting device 50, and a supporting framework 60 for the cutting device 50. In accordance with one aspect, the cutting device 50 is movable with respect to the supporting framework 60, as will be explained further with respect to FIGS. 7-12 below.

Figure 9:
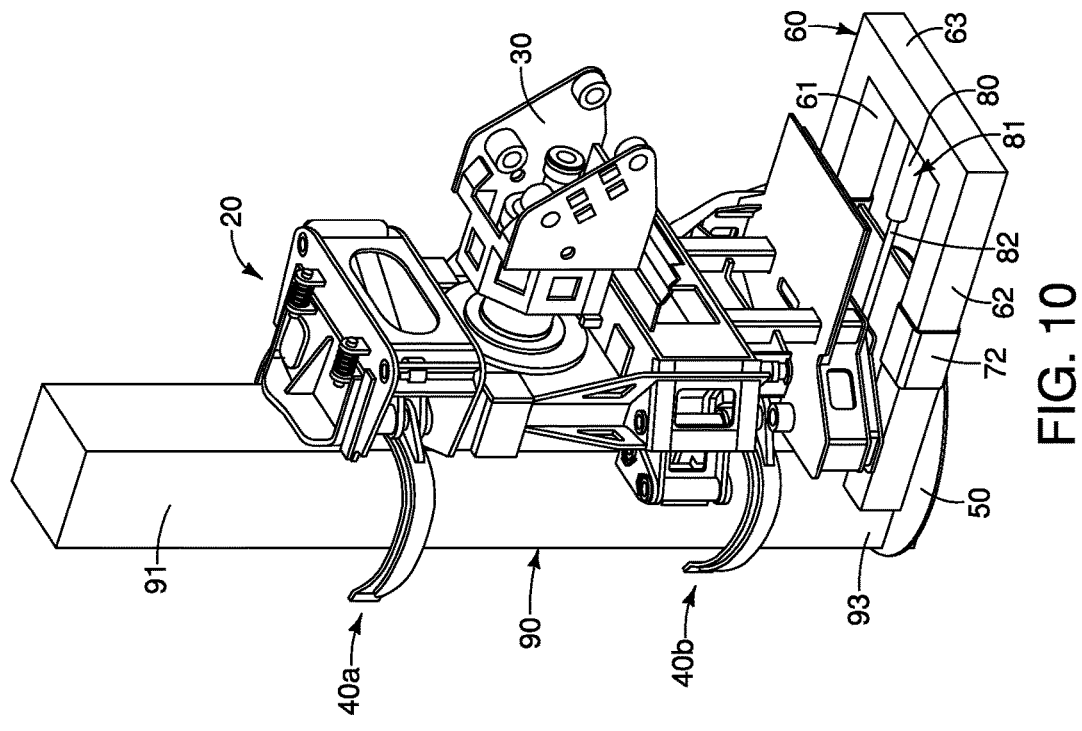
FIGS. 9-10 are, respectively, alternative perspective views of the apparatus of FIG. 1 before and after cutting an object.
Figure 10:
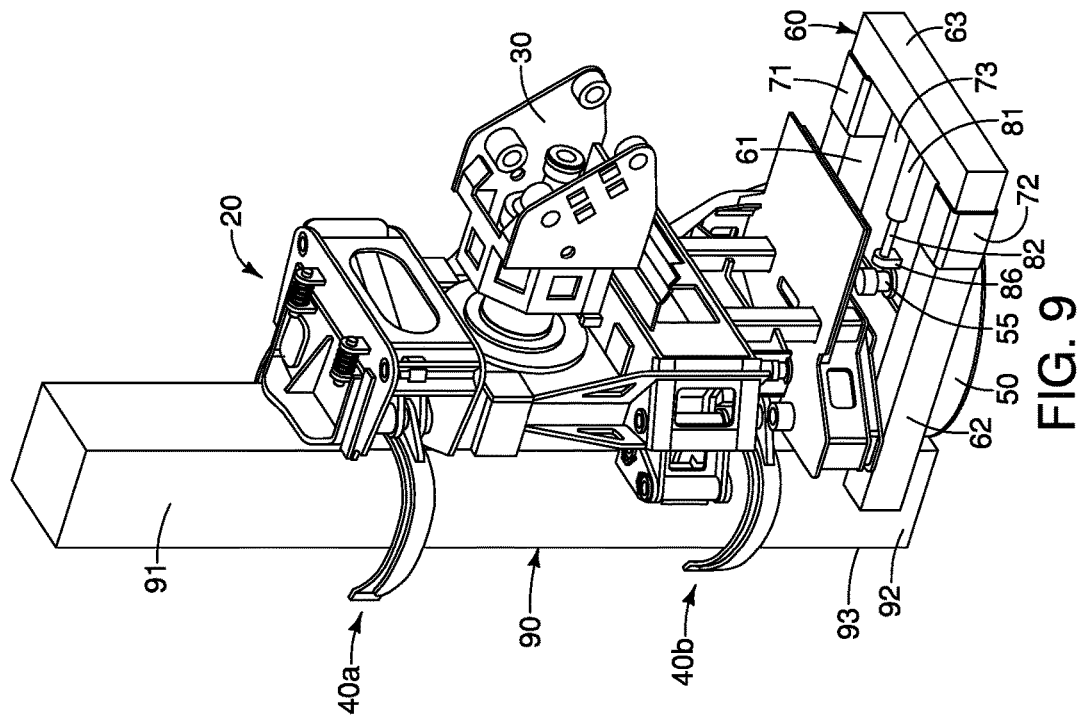

In one embodiment, the supporting framework 60 may be disposed beneath all, or substantially all, of the main frame 20, as best seen in FIGS. 1-4 and 7-12. The supporting framework 60 is secured to the main frame 20 at a location that allows full movement of the cutting device 50. For example, and without limitation, the supporting framework 60 may be secured to one or more forward-positioned and laterally-extending segments 38 of the main frame 20. In one example, an upper surface of the supporting framework 60 is secured to the forward-positioned and laterally-extending segments 38 of the main frame 20, as depicted in FIGS. 1-2 and 7-12, in a manner that permits axial movement of the cutting device 50 to its fully extended stroke as shown in FIGS. 8, 10 and 12. It will be appreciated that the supporting framework 60 may be secured to the main frame 20 at one or more different locations than segments 38, without altering the functionality and advantages of the system 10, as explained below. For example, additional supporting structure may extend between a portion of the main frame 20 and a lateral segment 63 of the supporting framework 60, thereby providing enhanced support for the supporting framework 60 and coupled components, without interfering with any moving parts.

In the non-limiting example of FIGS. 1-6, the supporting framework 60 comprises first and second guide rails 61 and 62, which may be parallel and laterally spaced apart relative to one another. The first and second guide rails 61 and 62 may be laterally separated by a lateral segment 63. In this manner, at least a portion of the supporting framework 60 forms a generally U-shaped frame.

A guide structure 70 may be movably coupled to the supporting framework 60. In one embodiment, the guide structure 70 comprises first and second guide arms 71 and 72 and a guide plate 73 extending laterally therebetween. The first and second guide arms 71 and 72 are disposed for axial movement along the first and second guide rails 61 and 62, respectively, as shown in FIGS. 1-2 and 7-12. Further, the guide plate 73, which is positioned substantially laterally between the first and second guide rails 61 and 62, is also disposed for axial movement relative to the first and second guide rails 61 and 62. While a generally flat guide plate 73 is depicted, the guide plate 73 may comprise other shapes while still performing the functions described.

In one embodiment, the first and second guide rails 61 and 62 comprise generally rectangular cross-sectional shapes, which are disposed within complementary hollow rectangular guide arms 71 and 72 having slightly larger inner diameters, as depicted in FIG. 4. However, other cross-sectional shapes, such as round, elliptical, and the like, may be used for the guide rails 61 and 62, as well as the guide arms 71 and 72, without departing from the present embodiments. Moreover, the guide arms 71 and 72 need not fully encircle the respective guide rails 61 and 62, i.e., they may be disposed less than 360 degrees around the guide rails. In further alternative embodiments, the guide arms 71 and 72 may comprise projections that travel within slots of the guide rails 61 and 62.

The guide plate 73 has front and rear regions 73a and 73b, respectively, as seen among FIGS. 1-2. The front region 73a of the guide plate 73 may be secured to a central region of the cutting device 50 using a coupling member 55. Therefore, as the guide plate 73 is advanced axially, the cutting device 50 is also advanced axially.

An actuation device 80 may be secured between the supporting framework 60 and the guide structure 70 in order to achieve axial advancement or retraction of the guide structure 70 relative to the supporting framework 60. In one embodiment, the actuation device 80 is secured between the lateral segment 63 of the supporting framework 60 and the guide plate 73, e.g., at a location rearward of the coupling member 55.

In one embodiment, the actuation device 80 may comprise a linear pneumatic actuator that is used to advance or retract the guide plate 73, and thus, the attached cutting member 50. For example, a fixed portion 81 of the actuation device 80 may be secured to the lateral segment 63 of the supporting framework 60, while an extendable portion 82 of the actuation device 80 may be coupled to the guide plate 73 at a fixation point 86, as best seen in FIGS. 1 and 7-9. In one example, the fixation point 86 for the extendable portion 82 of the actuation device 80 is located on an upper surface of the guide plate 73 and is positioned slightly rearward of the coupling member 55 that secures the guide plate 73 to the cutting device 50, as depicted in FIGS. 1 and 7-9.

While one exemplary positioning of the actuation device 80 has been shown, the exact location of the actuation device 80 may be varied, along with the frames to which is it secured, without departing from the spirit of the present embodiments. Moreover, while a linear pneumatic arrangement is depicted for the actuation device 80, it will be appreciated that other mechanical, hydraulic, electrical, or other arrangements may be used, with or without additional components such as mechanical linkages, to achieve the desired movement of the guide structure 70 relative to the supporting framework 60.

In one embodiment, the front region 73a of the guide plate 73 may laterally terminate substantially immediately after it is secured to the central region of the cutting device 50 using a coupling member 55, as best seen in FIG. 1. In this manner, such a design allows just less than half of the cutting device 50, i.e., the portion extending forward beyond the front region 73a of the guide plate 73, to be advanced through the entirety of an object 90 before the center of the cutting device 50 (that is attached to the front region 73a of the guide plate 73) ever reaches the object 90, as best seen in FIG. 12 and explained further below.

In the non-limiting embodiment shown, the cutting device 50 comprises a circular saw with a rotating blade. In various embodiments, the cutting device 50 may comprise a saw mechanism with various non-circular shapes, plus any type of cutting surface or teeth, and may be reinforced with materials capable of cutting through targeted objects including but not limited to concrete, steel or steel-reinforced concrete, wood, and other objects. The cutting device 50 may be removable relative to the main frame 20 for maintenance purposes, or to switch cutting devices between applications. The cutting device 50 may be operatively coupled to a motor that enables selective actuation of the rotating blade of the cutting device 50.

Referring now to FIGS. 7-12, various perspective views are shown to depict the system 10 of FIGS. 1-6 before and after cutting an object 90. In an initial step, a user makes a determination of whether the system 10 will be used in a stand-alone manner, or if the system 10 should be coupled to any suitable machine, by way of example and without limitation, such as a mobile machine along the lines of a truck, tractor, forklift, automobile and the like. In the latter case, the adapter 30 may be removably coupled to any such machine using removable attachment linkages or coupling mechanisms that are generally known.

In one exemplary, non-limiting method of use, the system 10 may be coupled to the end of a boom of a machine, such as a tractor. The system 10 may be movable relative to the machine in various directions. For example, the system 10 may be tilted upward and downward, e.g., by actuation of a pneumatic or hydraulic cylinder coupled between the boom of the machine and the main frame 20 of the system 10. Further, the system 10 may be rotated circumferentially relative to the machine in a clockwise or counterclockwise direction when viewed head-on from the front. Still further directional movements of the system 10 relative to a machine, such as a tractor, are possible with the implementation of appropriate actuators, linkages and the like, as will be appreciated by those skilled in the art.

In an exemplary method step, the system 10 then is positioned in close proximity to the object 90. If the optional gripping devices 40a and 40b are used, they may be positioned such that the various arms 41a, 41b, 42a and 42b at least partially encircle the object 90, and then actuated such that the object 90 can be gripped appropriately. As noted above, any number of arms may be provided, so long as the object to be cut can be gripped appropriately. Alternatively, this method step may be omitted in the instance noted above in which the one or more gripping devices 40a and 40b are omitted altogether, and the cutting device 50 can make an appropriate cut into the object 90 without stabilization assistance from such gripping devices.

The system 10 is positioned in close proximity to the object 90 such that the cutting device 50 is positioned at a desired location 93 between first and second regions 91 and 92 of the object 90. The location 93 corresponds to a location at which the cutting device 50 will enter into and cut through the object 90.

Prior to cutting the object 90, the actuator 80 may be in a partially or fully retracted position. For example, the extendable portion 82 of the actuation device 80 may be at a relatively short, or minimal, stroke length. Accordingly, the guide plate 73 and the coupled cutting device 50 are positioned closer to the lateral segment 63 of the supporting framework 60, i.e., partially or fully retracted relative to the object 90, as shown in FIGS. 7, 9 and 11. Further, at this time, the first and second guide arms 71 and 72 are positioned closer to rear regions 61a and 62a of the guide rails 61 and 62, respectively.

In a next step, after the system 10 has been positioned in close proximity to the desired location 93 of the object 90, the actuator 80 is actuated to cause the extendable portion 82 to extend in a forward direction, i.e., towards the object 90. At this time, the guide plate 73 is advanced towards the object 90 in a linear manner, with the first and second arms 71 and 72 being guided linearly along the guide rails 61 and 62, respectively. Accordingly, the first and second guide arms 71 and 72 are positioned closer to front regions 61b and 62b of the guide rails 61 and 62, respectively, as shown in FIGS. 2, 8, 10 and 12.

Advantageously, guiding of the first and second arms 71 and 72 along the guide rails 61 and 62 allows for a smooth linear path for the guide plate 73, and the cutting device 50 coupled thereto. The length of the maximum stroke of the actuation device 80 may be set such that, even at full extension of the extendable portion 82, the first and second guide arms 71 and 72 of the guide structure 70 cannot separate from the supporting framework 60 while cutting the object 90. Optionally, stop members may be provided to further ensure the first and second guide arms 71 and 72 cannot separate from the supporting framework 60.

The advancement of the guide plate 73 towards the object 90 causes the cutting device 50, coupled to the guide plate 73, to be advanced at least partially through the object 90 in a linear manner. In one method, the cutting device 50 is advanced far enough to cut through the object 90 entirely, thus separating the first and second regions 91 and 92 at the location 93, as shown in FIGS. 8, 10 and 12.

In one exemplary method, slightly less than half of the cutting device 50 is advanced through the entirety of the object 90 before the center of the cutting device 50, which may be coupled to the guide plate 73 via coupling member 55, ever reaches the object 90, as depicted in FIG. 12. Notably, if a circular saw is used for the cutting device 50, a radius of the circular saw may be dimensioned to be greater than a thickness t of the object, as depicted in FIG. 12, to ensure that approximately just less than half of the cutting device 50 can extend through the thickness of the object 90 in a single cut.

Advantageously, the system 10 can perform a single cut into one side of the object 90 and the cutting device 50 can extend through the object 90. It is not required that the cutting device 50 extend partially into the object 90 at one location, and then be repositioned to partially cut into the object 90 at second or more locations, in order to cut through a thickness of the object 90. This achieves a significant advantage of reducing the number of cutting and repositioning steps that are required to extend fully through the object 90 at one desired location to separate segments 91 and 92.

After the object 90 is cut at the desired location 93, the actuator 80 and the cutting device 50 may be retracted, and a different location of the object 90, or another object altogether, may be cut in a similar manner. It should be noted that a variety of optional additional steps may be performed, for example, using supplemental cutting, gripping, infeed rollers or other equipment, e.g., provided at the one or more coupling regions 48 of the main frame 20.

As noted above, the cutting device 50 may be capable of cutting through targeted objects including but not limited to concrete, steel, steel-reinforced concrete, wood, and other objects. As one example, concrete pilings may be conveniently cut to a desired length using the system 10. In further applications, the system 10 may be useful for demolition of structures, e.g., the system 10 may be provided at the top floor of a building or parking structure and may be used to cut through vertical supports, even concrete supports having reinforced steel bars, in order to help demolish the structure. Still numerous further applications for the system 10 are possible, and the above examples are not intended to be construed as limiting in any manner.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. An apparatus for cutting an object, the apparatus comprising:
   a cutting device operatively coupled to a main frame;
   a gripping device having forward free ends and rearward ends, wherein the rearward ends are pivotally coupled to the main frame so as to move the forward free ends toward each other to grip an object to be cut;
   an actuation device operatively coupled to the cutting device; a guide structure coupled at least partially between the cutting device and the actuation device; and
   a supporting framework, wherein the supporting framework provides a guiding path for linear advancement or retraction of the guide structure, and in turn linear advancement or retraction the cutting device, upon actuation of the actuation device, wherein the actuation device is secured to a central location of the supporting framework,
   wherein the supporting framework comprises first and second guide rails, wherein a cross-sectional shape of the first and second guide rails is one of a rectangle, circle or ellipse, and
   wherein the cross-sectional shape is at a plane perpendicular to the first and second guide rails and passing over a rotation axis of the cutting device,
   wherein the cutting device is positioned rearward in a retracted state and forward in an extended state, and
   wherein a forward edge portion of the cutting device is extendable in a direction of the linear advancement and gets closer to the forward free ends of the gripping device than the rearward ends of the gripping device in the extended state.

2. The apparatus of claim 1, wherein the first and second guide rails are parallel and laterally spaced apart relative to one another.

3. The apparatus of claim 2, wherein the first and second guide rails are separated by a lateral segment, such that at least a portion of the supporting framework forms a generally U-shape.

4. The apparatus of claim 3, wherein a fixed end of the actuation device is secured to the lateral segment of the supporting framework.

5. The apparatus of claim 2, wherein the guide structure comprises first and second arms and a guide plate extending laterally therebetween, wherein the first and second guide arms are disposed for axial movement along the first and second guide rails, respectively.

6. The apparatus of claim 5, wherein a first region of the guide plate is coupled to the cutting device, and a second region of the guide plate is secured to the actuation device.

7. The apparatus of claim 1, wherein an extendable portion of the actuation device is coupled directly to the guide structure, and a fixed portion of the actuation device is secured directly to the supporting framework.

8. The apparatus of claim 1, wherein the actuation device comprises a linear actuator.

9. The apparatus of claim 1, wherein the first and second guide rails are parallel and laterally spaced apart relative to one another, and
   wherein the first and second guide rails are separated by a lateral segment that is fixed relative to the first and second guide rails, such that at least a portion of the supporting framework forms a generally U-shape.

10. The apparatus of claim 1, wherein the cutting device is a circular saw.

11. An apparatus for cutting an object, the apparatus comprising:
    a cutting device operatively coupled to a main frame;
    a gripping device having forward free ends and rearward ends, wherein the rearward ends are pivotally coupled to the main frame so as to move the forward free ends toward each other to grip an object to be cut;
    a supporting framework comprising first and second guide rails; an actuation device, wherein a first portion of the actuation device is operatively coupled to the cutting device, and a second portion of the actuation device is secured to the supporting framework; and
    a guide structure coupled at least partially between the cutting device and the actuation device,
    wherein the supporting framework provides a guiding path for linear advancement or retraction of the cutting device, upon actuation of the actuation device,
    wherein the cutting device is positioned rearward in a retracted state and forward in an extended state,
    wherein a forward edge portion of the cutting device is extendable in a direction of the linear advancement and gets closer to the forward free ends of the gripping device than the rearward ends of the gripping device in the extended state,
    wherein the guide structure comprises first and second arms disposed for axial movement along the first and second guide rails, respectively,
    wherein forward ends of the first and second arms are disposed rearward of a center rotating axis of the cutting device,
    wherein the cutting device remains axially stationary relative to the guide structure, and
    wherein the first and second arms are disposed at least partially circumferentially external to the first and second guide rails, respectively.

12. The apparatus of claim 11, wherein the first and second guide rails are parallel and laterally spaced apart relative to one another.

13. The apparatus of claim 11, wherein an extendable portion of the actuation device is coupled directly to the guide structure, and a fixed portion of the actuation device is secured directly to the supporting framework.

14. The apparatus of claim 11, wherein the center rotating axis of the cutting device is in a plane intersecting with a longitudinal axis of the actuation device.

15. The apparatus of claim 11, wherein a fixation point for the first portion of the actuation device to the guide structure is positioned rearward of a coupling member securing the guide structure to the cutting device.

16. An apparatus for cutting an object, the apparatus comprising:
a cutting device operatively coupled to a main frame;
a gripping device having forward free ends and rearward ends, wherein the rearward ends are pivotally coupled to the main frame so as to move the forward free ends toward each other to grip an object to be cut;
an actuation device operatively coupled to the cutting device; a guide structure coupled at least partially between the cutting device and the actuation device; and
a supporting framework, wherein the supporting framework provides a guiding path for linear advancement or retraction of the guide structure, and in turn linear advancement or retraction the cutting device, upon actuation of the actuation device, wherein the supporting framework comprises first and second guide rails, wherein the guide structure comprises first and second arms disposed for axial movement along the first and second guide rails, respectively,
wherein the first and second arms encircle the first and second guide rails, respectively,
wherein the cutting device remains axially stationary relative to the guide structure,
wherein the cutting device is positioned rearward in a retracted state and forward in an extended state, and
wherein a forward edge portion of the cutting device is extendable in a direction of the linear advancement and gets closer to the forward free ends of the gripping device than the rearward ends of the gripping device in the extended state.

17. The apparatus of claim 16, wherein a cross-sectional shape of the first and second guide rails is one of a rectangle, circle or ellipse.

18. The apparatus of claim 16, wherein the first and second guide rails are parallel and laterally spaced apart relative to one another.

19. The apparatus of claim 18, wherein the first and second guide rails are separated by a lateral segment that is fixed relative to the first and second guide rails, such that at least a portion of the supporting framework forms a generally U-shape.

20. The apparatus of claim 16, wherein the actuation device comprises a linear actuator.

* * * * *